(12) United States Patent
Fan

(10) Patent No.: US 8,567,600 B2
(45) Date of Patent: Oct. 29, 2013

(54) APPARATUS FOR HOLDING PORTABLE ELECTRONIC DEVICE

(76) Inventor: Eagle Fan, Chu-Pei (TW)

( * ) Notice: Subject to any disclaimer, the term of this patent is extended or adjusted under 35 U.S.C. 154(b) by 201 days.

(21) Appl. No.: 13/213,564

(22) Filed: Aug. 19, 2011

(65) Prior Publication Data

US 2013/0043779 A1 Feb. 21, 2013

(51) Int. Cl.
*B65D 85/00* (2006.01)

(52) U.S. Cl.
USPC .......... 206/320; 206/762; 206/45.23; 206/756

(58) Field of Classification Search
USPC .......... 206/320, 762, 756, 477, 736, 753, 759, 206/45.23, 45.2; 224/929; 220/323, 324, 220/326, 827
See application file for complete search history.

(56) References Cited

U.S. PATENT DOCUMENTS

| | | | | |
|---|---|---|---|---|
| 2,567,564 A * | 9/1951 | Ingraham | ...................... | 368/316 |
| 2,627,067 A * | 1/1953 | Rose | ............................ | 348/842 |
| 3,062,917 A * | 11/1962 | Rose | ............................ | 348/842 |
| 3,162,997 A * | 12/1964 | Schmidt | ....................... | 368/276 |
| 4,416,392 A * | 11/1983 | Smith | ............................ | 221/45 |
| 4,452,373 A * | 6/1984 | Pearce et al. | ................. | 220/4.22 |
| 5,009,310 A * | 4/1991 | Finney | ......................... | 206/229 |
| 5,325,970 A * | 7/1994 | Dillon et al. | ................. | 206/576 |
| 5,632,373 A * | 5/1997 | Kumar et al. | ................ | 206/305 |
| 6,092,707 A * | 7/2000 | Bowes, Jr. | ..................... | 224/435 |
| 6,109,446 A * | 8/2000 | Foote | ........................... | 206/759 |
| 6,574,834 B2 * | 6/2003 | Fedon | ............................ | 16/225 |
| 8,186,508 B2 * | 5/2012 | Fan | ................................ | 206/320 |
| 2005/0061815 A1 * | 3/2005 | Wong | ........................... | 220/281 |
| 2005/0231930 A1 * | 10/2005 | Jao | ................................ | 361/807 |
| 2007/0227923 A1 * | 10/2007 | Kidakarn | ..................... | 206/320 |
| 2011/0259789 A1 * | 10/2011 | Fan | ............................... | 206/701 |

* cited by examiner

*Primary Examiner* — Steven A. Reynolds
(74) *Attorney, Agent, or Firm* — Rabin & Berdo, P.C.

(57) ABSTRACT

An apparatus for holding portable electronic device is provided, including a receiving seat, an upper cover, at least a resilient element and at least a stopping cover. The receiving seat and the upper cover are coupled together on one side. The resilient element is to provide a force to pull the upper cover and the receiving seat together face to face. The stopping cover is located at the bottom of receiving seat. Furthermore, a viscosity anti-slippery layer is located at the bottom surface of the receiving seat. In this manner, the apparatus can hold a portable electronic device in a vehicle and facilitate one-hand operation to improve convenience.

6 Claims, 9 Drawing Sheets

APPARATUS FOR HOLDING PORTABLE ELECTRONIC DEVICE

FIELD OF THE INVENTION

The present invention generally relates to an apparatus for holding device, and more specifically to an apparatus for holding portable electronic device.

BACKGROUND OF THE INVENTION

An apparatus for holding electronic device usually must include the three features: easy to operate, firm clamping and not prone to random movement. The easy-to-operate criterion means that putting and removing the device from the device holder can be easily executed. The firm clamping criterion means that the device is firmed clamped by the device holder once clamped until released. The not-prone-to-random-movement criterion means that the device holder will not randomly move in the vehicle due to the swirl or bumpy road condition to ensure the device will stay stationary.

As the device to be held may be for different uses and purposes, additional functions for the device holder are in demands. For example, for devices with a display, such as smart phone with GPS or navigator, the driver is required to read the display for information. In this situation, the device holder must be able to adjust the direction so that the driver can have a comfortable viewing angle to the display or prevent the display from sunlight reflection to interfere with viewing, and so on.

For the aforementioned object, the inventor of the present invention filed a patent application, U.S. patent application Ser. No. 12/753,099. The device holder can provide good clamping state, and has a shading effect for the sunshine so that the driver can have a better viewing of the display. However, because the invention disclosed in the filed application still requires the user to use both hands to open up the device holder, the operation is not sufficiently convenient to put the device into or remove the device from the holder. In addition, to meet the not-prone-to-random-movement criterion, the holder must have a sufficient weight, which adds inconvenience to portability. Hence, the inventor further provides an enhancement and improvement to the aforementioned application.

SUMMARY OF THE INVENTION

The primary object of the present invention is to provide an apparatus for holding portable electronic device, able to satisfying the aforementioned three features/criteria, namely, easy to operate, firm clamping and not prone to random movement. The apparatus, when not in use, has an appearance of a box, is light weighted and portable.

To achieve the object, the apparatus for holding portable electronic device of the present invention includes a receiving seat, an upper cover, at least a resilient element, and at least a stopping cover. The receiving seat and the upper cover are coupled together on one side. The resilient element is to provide a force to pull the upper cover and the receiving seat together face to face so that the apparatus looks like a closed box when the apparatus is not in use. The stopping cover is located at the bottom of receiving seat. Furthermore, a viscosity anti-slippery layer is located at the bottom surface of the receiving seat. When the apparatus is not in use, the stopping cover covers on the outside of the anti-slippery layer at the receiving seat bottom. When the stopping cover is flipped open, a part of the stopping cover will extend beyond the receiving seat from the bottom surface of the receiving sea towards the coupling side of the receiving seat and the upper cover. In this manner, the apparatus can hold a portable electronic device in a vehicle.

The present invention can facilitate further convenience by enabling the user to open up the upper cover with a single hand for putting the device in or retrieve the device from the apparatus. The present invention also maintains the functions of sun-shading and firm clamping to achieve the aforementioned features/criteria.

The viscosity anti-slippery layer and the stopping cover at the bottom of the receiving seat are another main improvement of the present invention. The anti-slippery layer uses the viscosity characteristic to provide strong friction to prevent the apparatus from random shift in the vehicle during driving while reducing the necessary weight of the apparatus to stay stationary. The stopping cover, when in use, will increase the bottom surface area of the apparatus so that the apparatus will not be easily tipped over. Because the stopping cover protrudes beyond the coupling side of the receiving seat and the upper cover, the upper cover can be opened by one hand, instead of two. As the stopping cover covers on the outside of the viscosity anti-slippery layer, the stopping cover can prevent the anti-slippery layer from sticking to other objects when carried in a bag.

The upper cover of the present invention further includes a flipping element, located close to the center line of the coupling between the upper cover and the receiving seat so that the apparatus will be stable when using the flipping element to open up the upper cover.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
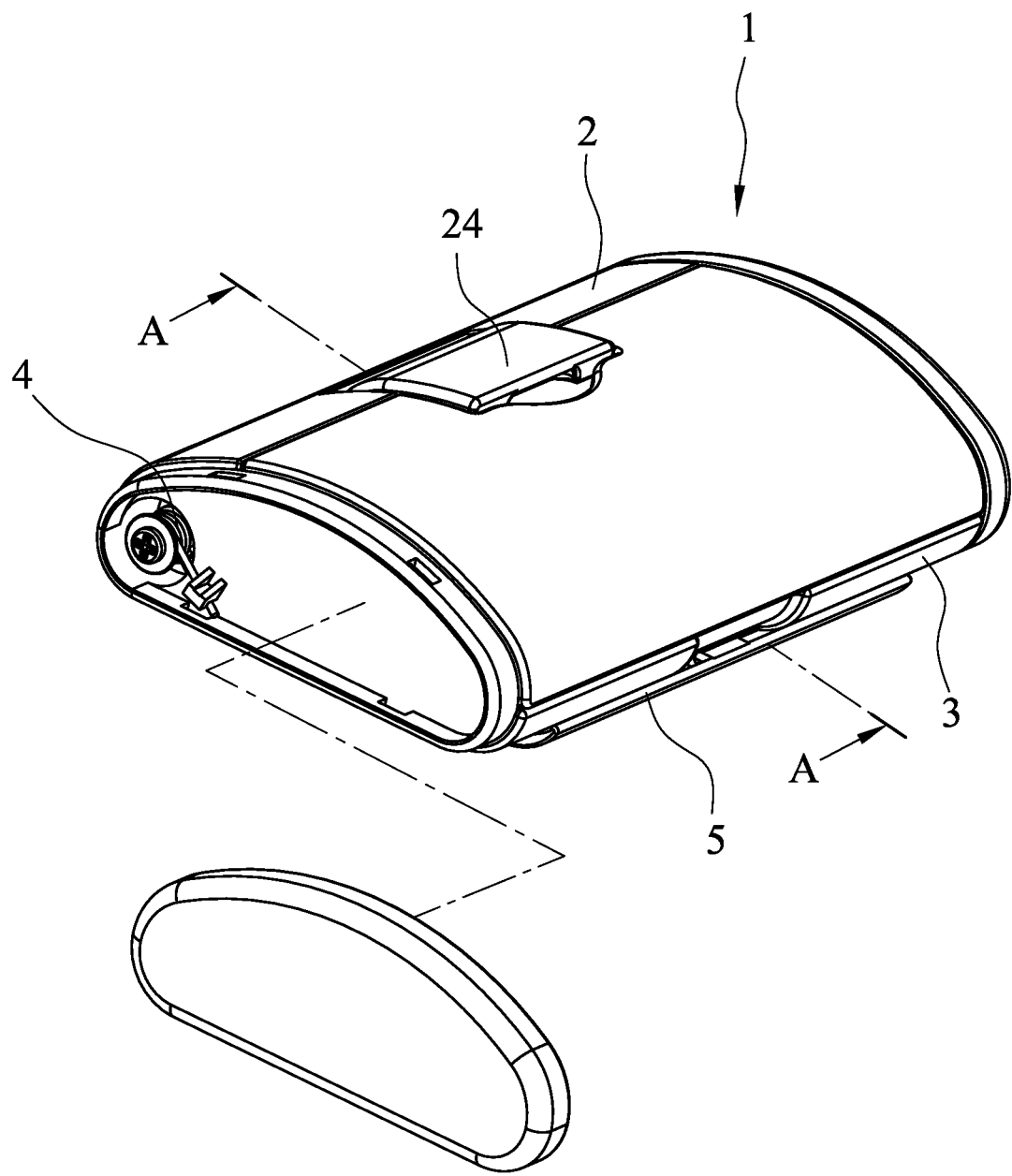
FIG. 1 shows a schematic view of an apparatus for holding portable electronic device according to the invention.
Figure 2:
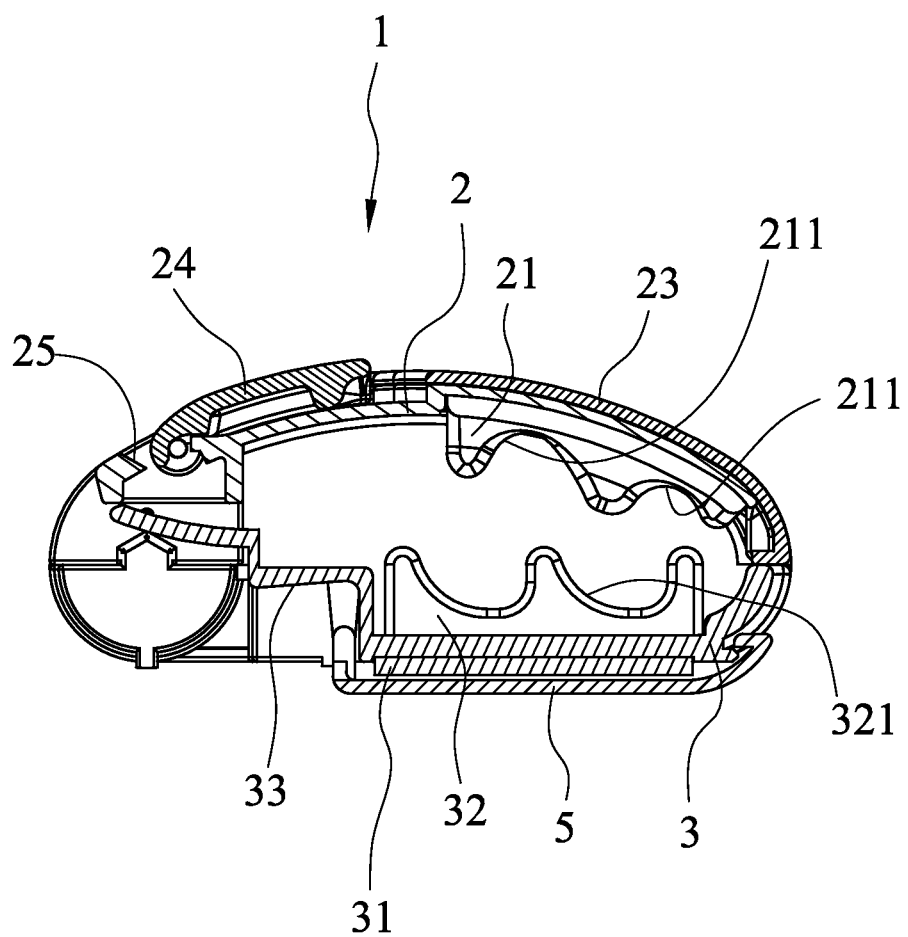
FIG. 2 shows an AA cross-section view of FIG. 1.

FIG. 1 and FIG. 2 show a schematic view and a cross-sectional view of the present invention respectively. An apparatus 1 for holding portable electronic device includes an upper cover 2, a receiving seat 3, at least a resilient element 4 and at least a stopping cover 5. Receiving seat 3 and upper cover 2 are coupled together on one side. Resilient element 4 is located within the coupling structure of receiving seat 3 and upper cover 2 to provide a force to pull upper cover 2 and receiving seat 3 toward each other so that upper cover 2 and receiving seat 3 form a closed box when not holding a device. Stopping cover 5 is located at the bottom of receiving seat 3. Furthermore, a viscosity anti-slippery layer 31 is located at bottom surface of receiving seat 3. In this manner, the opened stopped cover 5 and anti-slippery layer 31 of receiving seat 3 will keep apparatus 1 at contact surface. Then, one hand is sufficient to slip open upper cover 2 for easy putting in or retrieving the device from apparatus 1. The function of clamping the device is accomplished by upper cover 2 and receiving seat 3.

Figure 3:
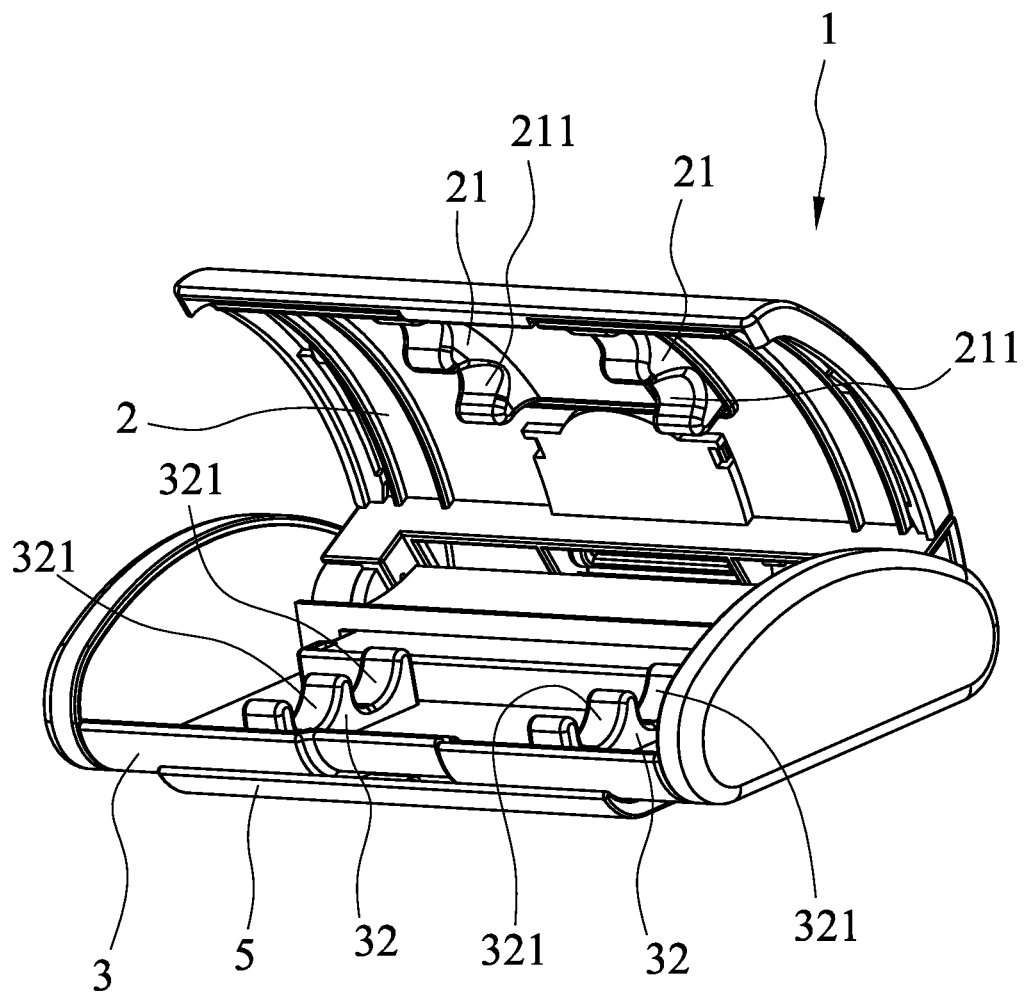
FIG. 3 shows a schematic view of the present invention with upper cover opening.

The following describes each component of the structure and related functions in more details. The present invention uses upper cover 2 and receiving seat 3 for clamping the device. As shown in FIG. 3, upper cover 2 and receiving seat 3 are coupled on one side for convenient open or close. Resilient element 4 can be a button spring to provide a force for closing upper cover 2 and receiving seat 3 when not holding a device. To open upper cover 2 from receiving seat 3 must overcome the force of resilient element 4. Receiving seat 3 has a shape matching the shape of upper cover 2 so that upper cover 2 and receiving seat 3 form a shape of a closed box when close. The present invention uses an inner wall of upper cover 2 and receiving seat 3 to clamp on the top edge and bottom edge of an object respectively, such as, a portable electronic device. To maintain the clamped object stay in a tilted angle, at least a positioning element 32 is formed on the inner wall of receiving seat 3 and a keeping element 21 is formed on the inner wall of upper cover 2. Positioning element 32 and keeping element 21 have a wavy shape, but with different curvature, as shown in FIG. 2. Positioning element 32 and keeping element 21 have surface layer made of anti-slippery material, and form a plurality of location positioning areas 211, 321 between a plurality of wave peaks. Location positioning areas 211, 321 can provide support to the top edge and the bottom edge of the object when holding the object so that the object can title at different angles for adjustment and easy viewing.

Figure 4:
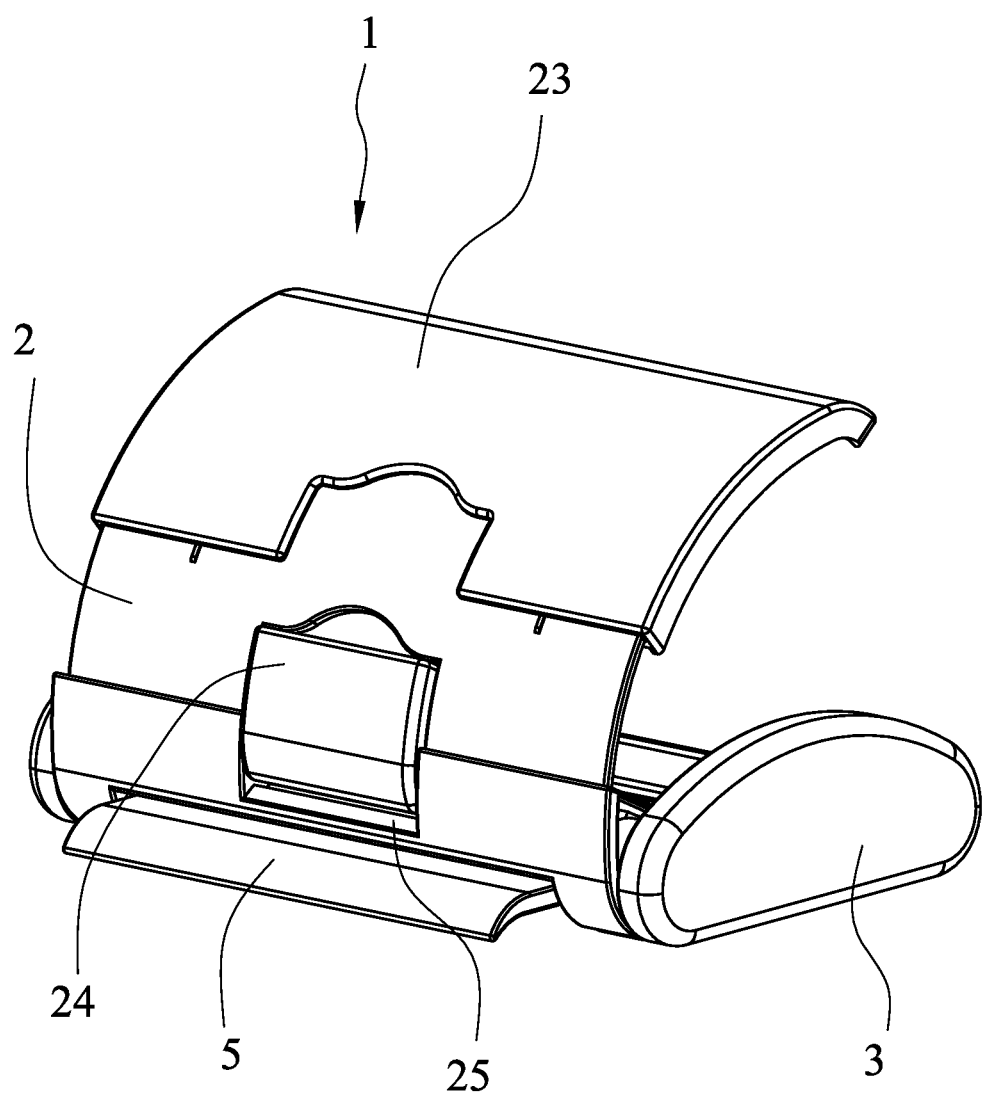
FIG. 4 shows a schematic view of the present invention with upper cover opening and shading plate pulled out.

As shown in FIG. 4, upper cover 2 further includes a shading plate 23 and a flipping element 24. Shading plate 23 is a plate located slidably on upper cover 2. The direction of sliding is towards the direction away from the coupling side of upper cover 2. After sliding, shading plate 23 is partially extended beyond upper cover to provide additional shading capability. When not in use, shading plate 23 overlaps with upper cover 2. Refer to FIG. 2 and FIG. 4. Flipping element 24 is coupled to upper cover 2. The center line of coupling is close to the center line of coupling between upper cover 2 and receiving seat 3. A stopping surface 25 is formed at the location close to coupling location of flipping element 24. Stopping surface 25 limits opening angle between flipping element 24 and upper cover 2. Flipping element 24 is usually lying flat on upper cover 2, and is flipped up only when in use. When the flipping angle is larger than the opening angle, flipping element 24 will rotate upper cover in linkage so that upper cover 2 flips open. The flipping angle is the angle between the initial position and the final position of flipping element 24.

Figure 5:
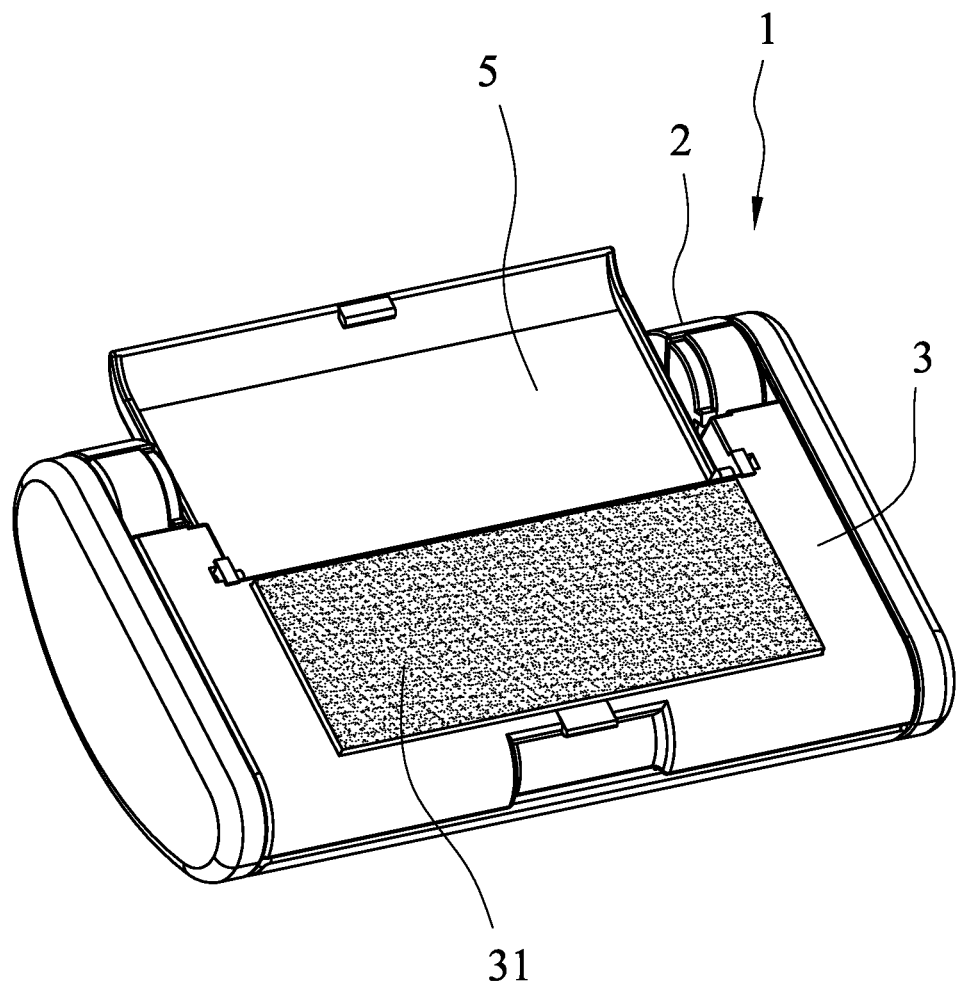
FIG. 5 shows a schematic view of the bottom structure of the present invention.

As shown in FIG. 5, to keep apparatus 1 stay stationary during the vehicle driving, the present invention uses anti-slippery layer 31 and stopping cover 5. Anti-slippery layer 31 is made of a soft rubbery material with viscosity, where the viscosity is reusable, i.e., can be attached to and detached from contact surface. When the surface of anti-slippery layer 31 gets dirty, wash anti-slippery layer 31 with water can remove attached rubbish material way from the surface to restore viscosity. The main purpose of stopping cover 5 is to ensure that the center of mass of apparatus 1 will be within bottom area of apparatus 1 formed by receiving seat 3 and stopping cover 5 when upper cover 2 flips open. Another purpose is to cover anti-slippery cover 31 when not in use to prevent anti-slippery layer 31 from dirt or other rubbish material for portability. Therefore, stopping cover is a large area slip-over with one side coupled to the bottom of receiving seat 3, as referring to FIG. 2. A limiting surface 33 is formed on the coupling of receiving seat 3 to limit the maximum opening angle of stopping cover 5. When stopping cover 5 opens up to the maximum angle, the lowest bottom location of stopping cover 5 is at the same level as anti-slippery layer 31 of receiving seat 3. To provide auxiliary support. When apparatus 1 is not in use, stopping cover 5 covers on the outside of anti-slippery layer 31 to prevent from attaching rubbish material. When in use, stopping cover is flipped open, as shown in FIG. 5, and a part of stopping cover 5 extends from the bottom of receiving seat 3, towards coupling side of upper cover 2 and receiving seat 3 to beyond so as to expand the bottom surface area of apparatus 1 as well as expose anti-slippery layer 31.

The following describes the operation of the present invention.

Figure 6:
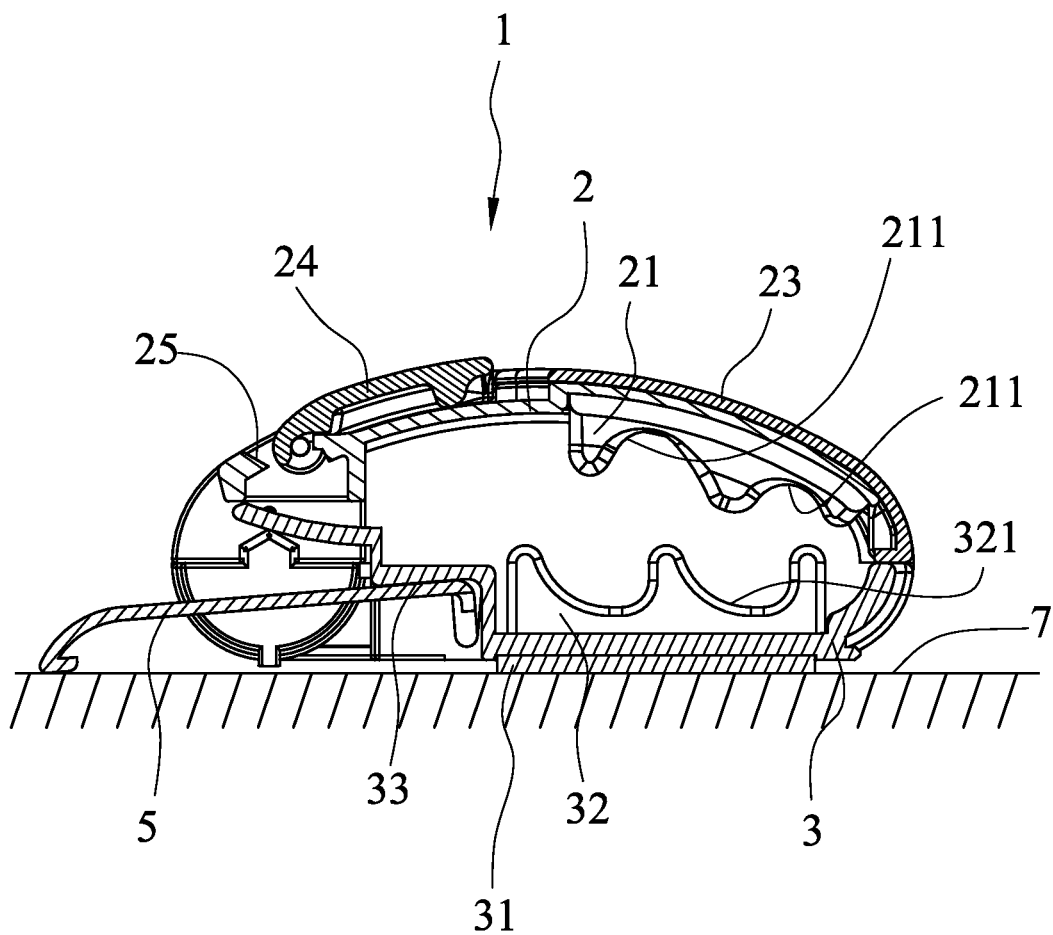
FIG. 6 shows a first cross-sectional view of the present invention in use.

As shown in FIG. 6, when apparatus 1 of the present invention is placed inside a vehicle, anti-slippery layer 31 at the bottom of receiving seat 3 is attached to contact surface 7. Stopping cover 5 is flipped open and stops on the outside of receiving seat 3 to increase bottom surface area as well as prevent apparatus 1 from tipping over when holding an object. Hence, during driving, apparatus 1 will firmly attached to contact surface 7. Upper cover 2 and receiving seat 3 will clamp tightly because of resilient element 4.

Figure 7:
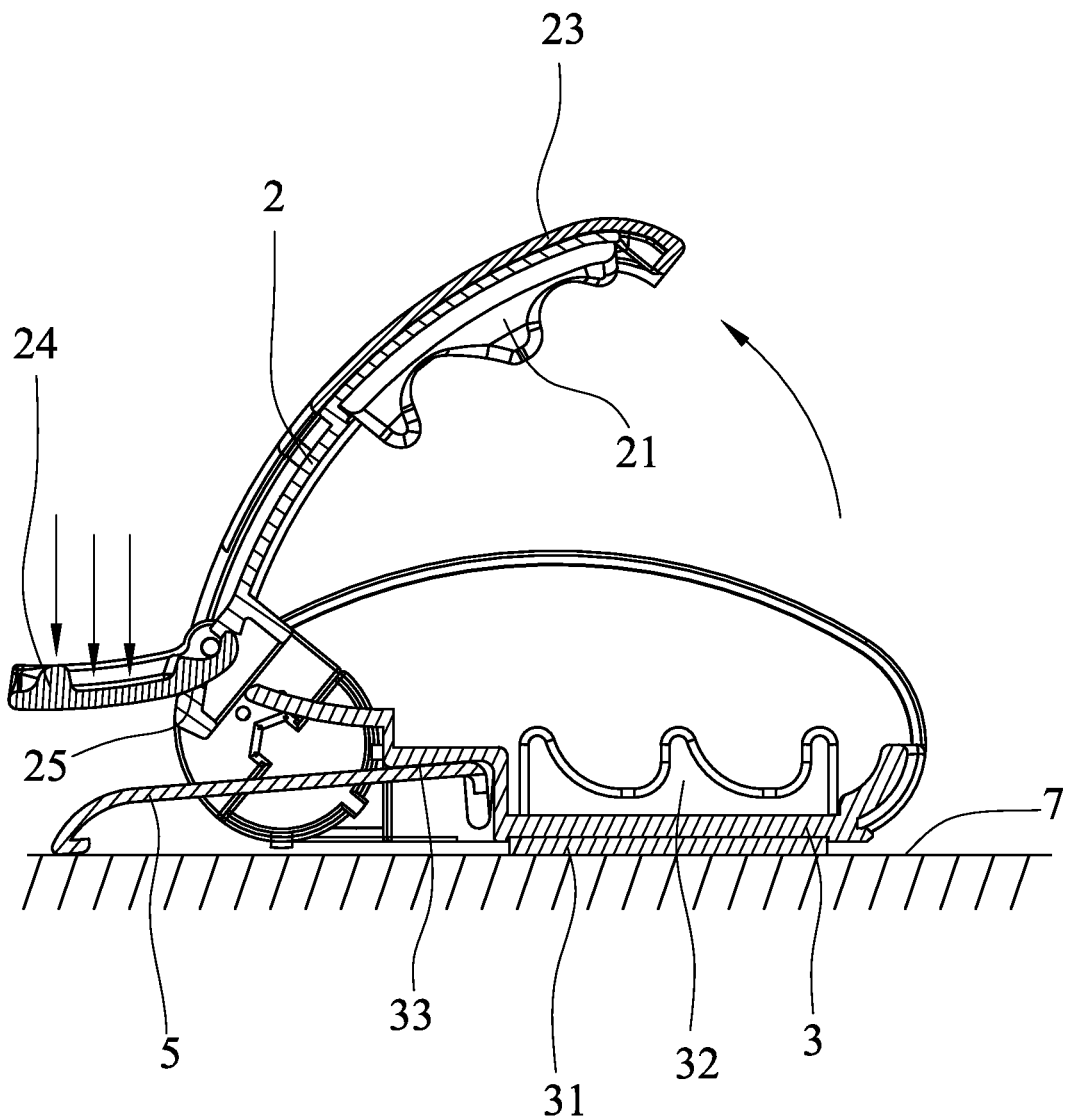
FIG. 7 shows a second cross-sectional view of the present invention in use.

As shown in FIG. 7, to put an object into apparatus 1, the user can flip open flipping element 24 on upper cover 2 with one hand and continue to press flipping element 24 so that upper cover 2 will open up because of the linkage movement. The feature of the present invention is to use the flipped open stopping cover 5 to stop on the outside of coupling side of receiving seat 3. During the continuous pressing of flipping element 24, the center of coupling of upper cover 2 and receiving seat 3 and the overall center of mass will fall within the area covered by stopping cover 5 so receiving seat 3 will not cock up. Hence, the user can use one hand to open upper cover 2 and place the object between upper cover 2 and receiving seat 3 conveniently.

Figure 8:
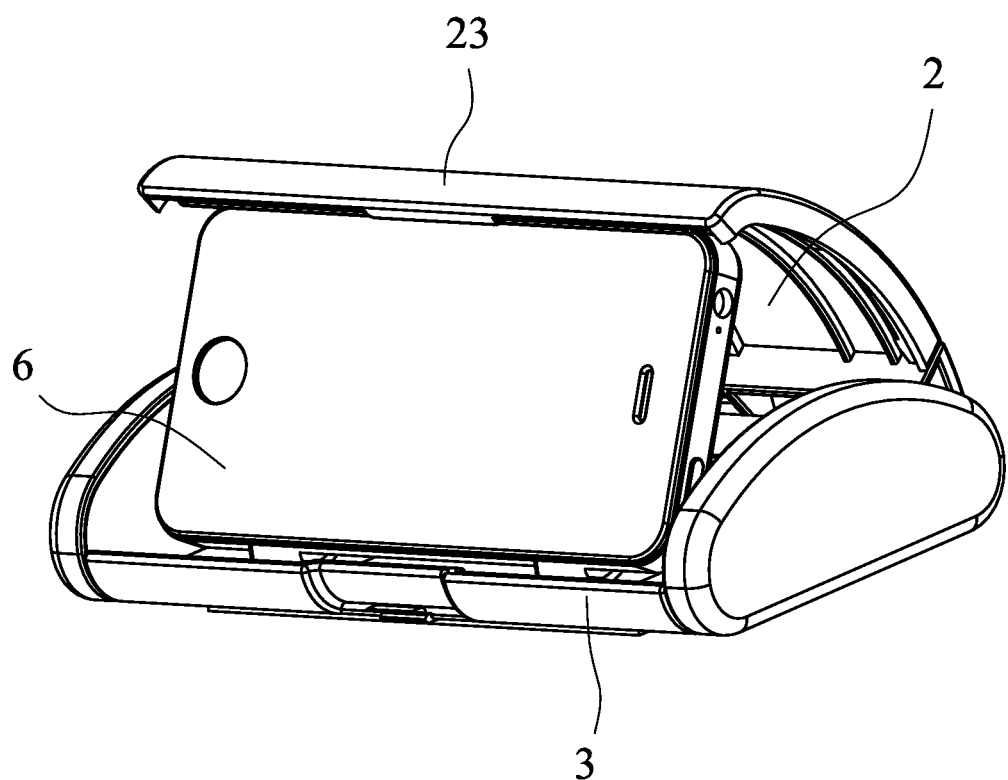
FIG. 8 shows a schematic view of the present invention holding an object.
Figure 9:
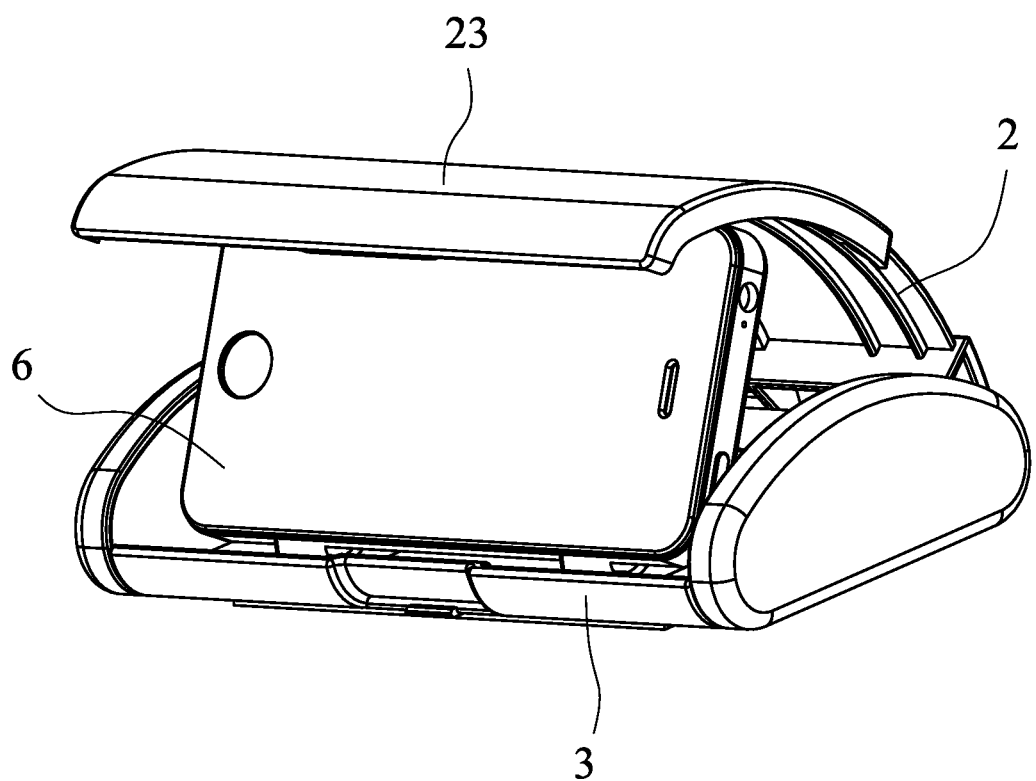
FIG. 9 shows a schematic view of the present invention holding an object and shading plate pulled out.

As shown in FIG. 8, when the external force disappears, resilient element 4 will exert a restoration force so that object 6 is clamped by upper cover 2 and receiving seat 3. Positioning element 32 and keeping element 21 can keep object 6 in appropriate tilt angle. Object 6 can be a smart phone or GPS. As shown in FIG. 9, shading plate 23 on upper cover 2 is pulled out to provide additional shading effect for object 6 so that the user can view the display information easily.

In summary, the apparatus of the present invention uses the stopping cover to stop on the outside of coupling side of the receiving seat to increase the bottom surface area as well as facilitate one-hand operation in flipping open the upper cover. During driving, the viscosity of the anti-slippery layer and the expanded bottom surface area will keep the apparatus stationary and prevent from random movement due to swirling or bumping road condition. For portability of the apparatus, the stopping cover can covers the outside of anti-slippery layer to prevent from getting dirty. The light-weighted design in the shape of a box also enhances the portability convenience.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for holding a portable electronic device, comprising:
   a receiving seat, a bottom of said receiving seat comprising at least an anti-slippery layer having viscosity,
   an upper cover, said receiving seat and said upper cover being coupled on one side,
   at least a resilient element, providing a force to pull said receiving seat and said upper cover together to clamp so that said receiving seat and said upper cover form a shape of a closed box when not holding an object,
   at least a stopping cover located at the bottom of said receiving seat,
   a positioning element formed on an inner wall of said receiving seat, having a wavy shape and a surface layer made of anti-slippery material, and forming a plurality of first location positioning areas between a plurality of first wave peaks; and
   a keeping element formed on inner wall of said upper cover, having a wavy shape, with a curvature different from said positioning element, and a surface layer made of anti-slippery material, and forming a plurality of second location positioning areas between a plurality of second wave peaks;
   when flipped open, said stopping cover partially extends from the bottom of said receiving seat, towards the coupling side of said upper cover and said receiving seat to beyond said receiving seat to expand a bottom surface area of said apparatus.

2. The apparatus as claimed in claim 1, wherein said upper cover is a sliding cover, with one side coupled to the bottom of said receiving seat, the coupling location is between the anti-slippery layer of the receiving seat and the coupling side with said upper cover, said stopping cover can cover an outside of said anti-slippery layer, but when said stopping cover is flipped towards the coupling side of said receiving seat, said stopping cover extends partially beyond said receiving seat and exposes said anti-slippery layer.

3. The apparatus as claimed in claim 1, wherein a limiting surface is formed at a location close to the coupling side of said receiving seat to limit a maximum opening angle for said stopping cover, and when said stopping cover opens up to said maximum angle, the lowest surface of said stopping cover is at the same level as said anti-slippery layer of said receiving seat.

4. The apparatus as claimed in claim 1, wherein said upper cover further comprises a flipping element coupled to said upper cover at a location close to a center line of the coupling side of said upper cover and said receiving seat, a stopping surface is further formed on said upper cover at a location close to the coupling of said flipping element to limit an opening angle of said flipping element, and when the flipping angle is greater than the opening angle, said flipping element rotates said upper cover in linkage movement.

5. The apparatus as claimed in claim 1, wherein said resilient element is a spring that provides a force for closing the upper cover and the receiving seat.

6. The apparatus as claimed in claim 1, wherein said upper cover further comprises a shading plate, said shading plate is a slidable plate on said upper cover, a direction of sliding is away from the coupling side of said upper cover, and after sliding, said shading plate protrudes beyond on one side of said upper cover.

* * * * *